Patented Aug. 30, 1927.

1,640,922

UNITED STATES PATENT OFFICE.

ATTILIO CELLINO, OF BUENOS AIRES, ARGENTINA, ASSIGNOR TO CENTRAL BATTERY CORPORATION, A CORPORATION OF NEW YORK.

PROCESS OF PREPARING POSITIVE ELECTRODES OF STORAGE BATTERIES.

No Drawing. Application filed June 15, 1916, Serial No. 103,858. Renewed January 8, 1927.

My invention relates to that class of electrical current giving devices known as storage or secondary batteries. A difficulty heretofore experienced in the use of such batteries has been the lack of permanence in the charge since, even when the battery circuit is open it gradually becomes discharged and its power lost. Moreover all forms of electrodes heretofore employed in such batteries have been subject to the defect that when removed from the electrolyte in a charged state they quickly become discharged and disintegrated and are thus made useless.

The object of my improvements is to obviate these difficulties and provide a positive electrode for a storage battery which will not only not discharge when the battery is open circuited, but which can be removed from the battery when charged and kept in a dry state without becoming discharged or disintegrated, so that when reassembled in a battery with a suitable electrolyte and negative electrode it shall be ready and efficient for immediate use.

To this end I form the positive battery electrode in the following manner. With an oxide of lead, such as red lead, or litharge, or a mixture of these I mix peroxide of manganese and sulfate of ammonia in solution in the proportion of approximately 12 per cent of peroxide and 4 per cent of the sulfate by volume. This is then mounted in suitable shape to form an electrode, as by being pasted upon a supporting structure of lead or lead alloy such, e. g., as the well known form of lead plate provided with cells for holding the active material, and the whole is then immersed in concentrated sulfuric acid for a period sufficient to effect thorough dehydration of the active material.

Immersion for from half an hour to an hour is usually sufficient to effect this result.

By this treatment not only is any water present withdrawn from the active material but the active material is given a peculiar coating or surface of a crystalline character, consisting probably of crystalline sulfate of lead, which prevents any subsequent hydration of the active material either by moisture of the atmosphere or in the electrolyte, thus preventing the discharge or disintegration of the electrode when removed from the battery and kept in a dry state.

After the treatment with sulfuric acid is completed the plate is removed from the acid and is ready to be used as a positive electrode of a storage battery in the usual manner.

What I claim as new and desire to secure by Letters Patent is:—

1. The process of preparing positive electrodes of storage batteries which consists in forming a mixture of an oxide of lead, peroxide of manganese and sulfate of ammonia, mounting the same in shape for use as an electrode and then subjecting the electrode to the action of sulfuric acid so as to dehydrate the active material of the electrode.

2. The process of preparing positive electrodes of storage batteries which consists in forming a mixture of an oxide of lead, peroxide of manganese and sulfate of ammonia, mounting the same in shape for use as an electrode and then dehydrating the active material of the electrode and at the same time forming thereon a coating whereby it is protected from hydration.

3. The process of preparing positive electrodes of storage batteries which consists in forming a paste of a mixture of an oxide of lead with approximately 12 per cent by volume of peroxide of manganese and 4 per cent by volume of sulphate of ammonia, mounting said paste in shape for use as an electrode, and immersing the electrode in concentrated sulphuric acid for from one half hour to one hour.

4. A positive electrode for storage batteries, such as may be formed by the hereindescribed process which consists in forming a mixture of an oxide of lead, peroxide of manganese and sulphate of ammonia, mounting the same in shape for use as an electrode and then subjecting the electrode to the action of concentrated sulphuric acid for a period sufficient to dehydrate the active material of the electrode.

In testimony whereof I have affixed my signature, this 14th day of June, 1916.

ATTILIO CELLINO.